(No Model.)

F. MOORE.
TRIPLE VALVE FOR AUTOMATIC BRAKE MECHANISMS.

No. 400,108. Patented Mar. 26, 1889.

WITNESSES:

INVENTOR,
Frank Moore,
by George H. Christy
Att'y.

UNITED STATES PATENT OFFICE.

FRANK MOORE, OF PITTSBURG, PENNSYLVANIA.

TRIPLE VALVE FOR AUTOMATIC BRAKE MECHANISMS.

SPECIFICATION forming part of Letters Patent No. 400,108, dated March 26, 1889.

Application filed December 21, 1888. Serial No. 294,295. (No model.)

*To all whom it may concern:*

Be it known that I, FRANK MOORE, a citizen of the United States, residing at Pittsburg, in the county of Allegheny and State of Pennsylvania, have invented or discovered a certain new and useful Improvement in Triple Valves for Automatic Brake Mechanisms, of which improvement the following is a specification.

My invention relates to appliances employed in automatic brake mechanisms and ordinarily known as "triple valves," the function of which is to so control communication between a main air or brake pipe, an auxiliary reservoir, a brake-cylinder, and an exhaust-passage to the atmosphere that by a reduction of pressure in the brake-pipe the auxiliary reservoir and brake-cylinder are placed in communication to effect the application of the brakes, and by a restoration of pressure the brake-cylinder is placed in communication with the exhaust-passage to release the brakes, and the auxiliary reservoir is placed in communication with the brake-pipe to recharge the auxiliary reservoir for a succeeding application of the brakes. The essential features of devices of such character are connections with a main air or brake pipe, an auxiliary reservoir, a brake-cylinder, and a release or discharge valve, and a suitable valve or valves governing such connections, and special constructions to which, among others, my improvement is desirably applicable, are exemplified in the several Letters Patent of George Westinghouse, Jr., Nos. 168,359, 172,064, 220,556, 360,070, and 376,837.

The object of my invention is to provide simple and inexpensive means for recharging the auxiliary reservoir of an automatic brake mechanism after an application of the brakes without involving the necessity of releasing the brakes preliminary to such recharging, as has heretofore usually been the case, and thereby to obviate the liability to reduction of pressure in the auxiliary reservoirs by leakage in descending long grades, and the necessity for special appliances heretofore employed for keeping the train under control when the brakes are released to effect the recharging of the auxiliary reservoirs.

To this end my invention, general stated, consists in a triple valve having the inner surface of the wall of its piston-chamber provided with a recharging-groove adapted to establish communication between the brake-pipe and auxiliary reservoir during the period of application of the brakes.

The improvement claimed is hereinafter fully set forth.

Figure 1:
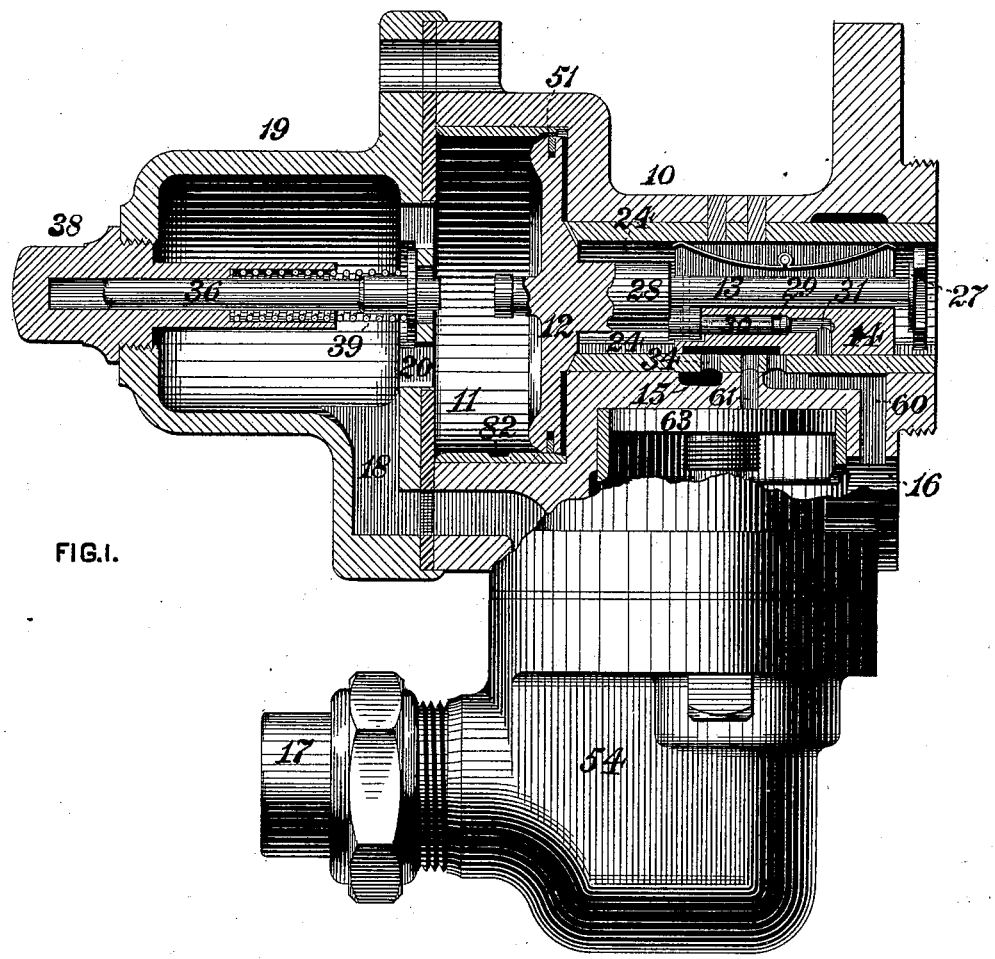
Figure 2:
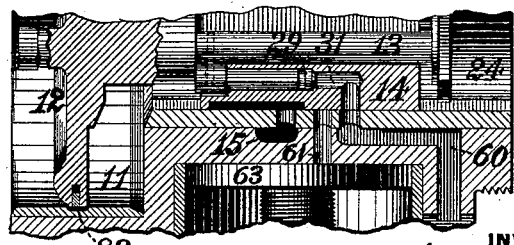

In the accompanying drawings, Figure 1 is a view, partly in elevation and partly in section, of a triple valve embodying my invention, the movable parts being shown in the positions occupied when the brakes are released; and Fig. 2, a partial longitudinal section showing the parts in the positions occupied when the brakes are applied.

My improvement is herein illustrated in connection with a triple valve of the construction which is set forth in Letters Patent No. 376,837 aforesaid, and which need not therefore be herein fully and at length described. The piston 12 is fitted to work in the cylindrical chamber 11, which communicates with one end of a chamber, 24, in the valve-casing 10, the opposite end of which chamber communicates with the auxiliary reservoir. The slide-valve 14, which is reciprocated by the piston-stem 13, and which works on the chamber 24, is provided with the usual graduating-valve, 29, which serves to retain the parts in position for holding the brakes to the wheels after application, the valve 14 controlling a port, 60, leading to the brake-cylinder passage 16, a port, 34, leading to the exhaust or discharge passage 15, and a port, 61, leading to a supplemental valve-chamber, 54, fitted with a supplemental piston, 63, by which the direct discharge of air from the brake-pipe into the brake-cylinder is effected in making emergency stops. The piston-chamber 11 communicates by ports 20 with the drain-cup 19, which in turn communicates by a passage, 18, leading through the supplemental valve-chamber 54, with the brake-pipe connection 17. The auxiliary reservoir is, as heretofore, charged after the release of the brakes by air which passes from the brake-pipe through the passage 18 and ports 20 to the piston-chamber 11, and thence through the feeding-groove 51.

In the operation of the triple valve in effecting the application of the brakes for ordinary or service stops the excess of pressure upon the piston 12 from the auxiliary reservoir and valve-chamber 24 above that on its opposite side, due to the reduction of pressure in the brake-pipe, forces the piston outwardly or to the left in Fig. 1, the movement of the piston unseating the graduating-valve 29 and bringing the slide-valve into such position as to close communication between the brake-cylinder port 60 and discharge-port 15 and to bring the port 31 into communication with the brake-cylinder port 60, thereby admitting air to the brake-cylinder from the auxiliary reservoir and applying the brakes by the usual connections from the piston of the latter. Upon the reduction of the auxiliary reservoir pressure to a degree slightly below that in the brake-pipe the piston 12 is moved in the opposite direction sufficiently far to seat the graduating-valve 29, as shown in Fig. 2, thereby preventing the further discharge of air from the auxiliary reservoir and holding the brakes to the wheels with a force proportionate to the reduction of pressure in the brake-pipe.

It will be seen that in the operation of the mechanism as heretofore constructed the release of the brakes is a necessary preliminary to the recharging of the auxiliary reservoir, inasmuch as the piston requires to be brought to the inner or right-hand extremity of its traverse (in which the valve 14 opens the discharge-port to the brake-cylinder) in order to admit of the passage of air to the auxiliary reservoir through the feeding-groove 51. To obviate such necessity of prior release of the brakes and the attendant objections before indicated, I form a small recharging groove or channel, 82, in the inner surface of the wall of the piston-chamber 11, said groove, which is controlled by the piston 12, being of such length and so located in the piston-chamber as to admit of the recharging of the auxiliary reservoir to the original or other desired brake-pipe pressure by the passage of air from the brake-pipe and drain-cup through the piston-chamber 11 and recharging-groove 82, past the piston 12, to the valve-chamber 24 and auxiliary reservoir, when the piston and slide-valve stand in such position as to close communication between the relief or discharge port and the brake-cylinder and between the brake-cylinder and the auxiliary reservoir, as shown in Fig. 2, in which position the brakes are, as before explained, held applied to wheels. The brakes can thus be held for any desired period without liability or tendency to be released by leakage from the auxiliary reservoir, and can be applied with greater force, if required, without previously releasing them and without in any wise interfering with their prompt and normal release when required, and the subsequent recharging of the auxiliary reservoir in the usual manner.

It will be obvious that the improvement is adaptable without other variation of or addition to existing structural details in the present standard constructions, and that its cost is merely nominal.

I am aware that a passage leading through the wall of a piston-chamber on the side of the piston which is open to the brake-pipe, said passage being controlled by a special valve and communicating with a pipe leading to an auxiliary reservoir, was known prior to my invention, and such construction, which differs both structurally and operatively from that devised by me, I distinctly disclaim.

I claim as my invention and desire to secure by Letters Patent—

1. In a triple-valve device for automatic brake mechanisms, a piston-chamber having the inner surface of its wall provided with a recharging groove or channel for the passage of fluid under pressure past the valve-operating piston from the brake-pipe to the auxiliary reservoir during the period of application of the brakes, substantially as set forth.

2. In a triple-valve device for automatic brake mechanisms, a piston-chamber having a recharging groove or channel formed in the inner surface of its wall, said groove being located in position to permit of the passage of fluid under pressure through the chamber past a valve-operating piston working therein in the position of rest of said piston after the application of the brakes, substantially as set forth.

3. In a triple-valve device for automatic brake mechanisms, the combination of a valve-operating piston, a connected valve controlling brake-cylinder supply and exhaust ports, and a piston-chamber communicating at opposite ends with a brake-pipe and with an auxiliary reservoir, respectively, and having the inner surface of its wall provided with a recharging groove or channel adapted to admit of the passage of fluid under pressure through the piston-chamber and past the piston when in position to effect the closure by the valve of both the supply and the exhaust ports of the brake-cylinder, substantially as set forth.

In testimony whereof I have hereunto set my hand.

FRANK MOORE.

Witnesses:
J. SNOWDEN BELL,
R. H. WHITTLESEY.